US006187171B1

(12) United States Patent
Tsuboi

(10) Patent No.: US 6,187,171 B1
(45) Date of Patent: Feb. 13, 2001

(54) UNLEADED HIGH-OCTANE GASOLINE COMPOSITION

(75) Inventor: Katsumi Tsuboi, Ohi-machi (JP)

(73) Assignee: Tonen Corporation, Saitama (JP)

( * ) Notice: Under 35 U.S.C. 154(b), the term of this patent shall be extended for 0 days.

(21) Appl. No.: 09/350,871

(22) Filed: Jul. 9, 1999

(30) Foreign Application Priority Data

Jul. 27, 1998 (JP) ..................... 2-2650498

(51) Int. Cl.[7] ..................... C01L 1/16

(52) U.S. Cl. ..................... 208/16; 208/17; 585/14

(58) Field of Search ..................... 208/16, 17; 585/14

(56) References Cited

U.S. PATENT DOCUMENTS

| | | | | |
|---|---|---|---|---|
| 3,723,293 | * | 3/1973 | Glessner et al. | 208/85 |
| 3,763,034 | * | 10/1973 | Kett et al. | 208/78 |
| 3,787,313 | * | 1/1974 | Pollitzer | 208/60 |
| 3,883,418 | * | 5/1975 | Drehman et al. | 208/66 |
| 4,522,705 | * | 6/1985 | Chu et al. | 208/120 |
| 4,594,144 | * | 6/1986 | James, Jr. et al. | 208/62 |
| 5,198,097 | * | 3/1993 | Bogdan et al. | 208/79 |
| 5,368,720 | | 11/1994 | Dolan et al. | 208/65 |
| 5,368,721 | | 11/1994 | Terry et al. | 208/146 |
| 5,711,767 | | 1/1998 | Gande et al. | 44/423 |

FOREIGN PATENT DOCUMENTS

| | | | |
|---|---|---|---|
| 0292298 | 11/1988 | (EP) | C10L/1/06 |
| 61-016985 | 1/1986 | (JP) . | |
| 63-317592 | 12/1988 | (JP) | C10G/35/24 |
| 09095688 | 4/1997 | (JP) | C10L/1/06 |
| 09286992 | 11/1997 | (JP) | C10L/1/22 |

* cited by examiner

*Primary Examiner*—Jacqueline V. Howard
(74) *Attorney, Agent, or Firm*—Joseph J. Allocca

(57) ABSTRACT

An unleaded high octane gasoline composition exhibiting reduced gum formation and improved air intake system and combustion chamber cleanliness is provided comprising at least (A) one reformate fraction produced by a continuous regeneration type reformer and/or (B) at least one reformate fraction produced by a fixed bed type reformer, said unleaded high octane gasoline composition satisfying the following conditions:

$$Z=(1/100)[\Sigma(ax)+(1/9)\Sigma(by)]<0.010$$

wherein Σ(ax) is a summation of (ax) wherein (a) is content (vol %) of a fraction falling into reformate fraction A, (x) is content (vol %) of aromatic hydrocarbons having a carbon number of 11 or more in the fraction (a) and Σ(by) is a summation of (by) wherein (b) is content (vol %) of a fraction falling into reformate fraction B, (y) is content (vol %) of aromatic hydrocarbons having a carbon number of 11 or more in fraction B; the content of aromatic hydrocarbons having a carbon number of 7 to 8 being 30 vol % or more; and having a research octane number of 96.0 or more.

3 Claims, No Drawings

UNLEADED HIGH-OCTANE GASOLINE COMPOSITION

FIELD OF THE INVENTION

This invention relates to an unleaded, high-octane gasoline composition, more particularly an unleaded, high-octane gasoline composition which forms little gums, and shows excellent effects of cleaning an air-intake system and combustion chamber of a gasoline engine.

BACKGROUND OF THE INVENTION

High-octane gasoline blending stocks produced by Fluid Catalytic Cracking (FCC) units and catalytic reformers have been more extensively used for automobile gasoline, since introduction of regulations on use of lead compounds, e.g., tetraethyl lead, as octane improvers. Furthermore, improvement of automobile mileage is increasingly socially required, which calls for higher engine compression ratio and hence higher-octane unleaded gasoline.

Such high-octane, unleaded gasoline contains large proportions of high-octane gasoline component stocks, e.g., those produced by FCC units and reformers, and toluene. For example, Japanese Patent Publication No. 3-21593 discloses unleaded, high-octane gasoline composed of reformate as the heavier fraction and FCC naphtha as the lighter fraction to have a research octane number of 96 or more. Japanese Patent Publication No. 7-10981 discloses unleaded, high-octane gasoline containing, as the essential components, reformate of specific properties, alkylate and isopentane, to have a research octane number of 99.5 or more. Octane number of reformate has been increased by increasing severity (high temperature operation) of reformers, fractionating reformate to extract higher-octane fraction and such like.

It is noted, however, that unleaded, high-octane gasoline causes several problems while it is stored or in service, such as accelerated formation of gums to clog devices associated with tank, and fuel systems (in particular, fuel filters) in the engine. The more functional gasoline engine is more sensitive to the effects of deposits in the air-intake system on engine performance. For example, the electronically controlled fuel injection device precisely controls air/fuel ratio to improve engine performance, and to improve mileage and exhaust gas composition. However, air/fuel ratio will be no longer adequately controlled when deposits are formed on the air-intake valve, because they will work as obstacles to flow of gasoline ejected out of the fuel injection device, with the result that its operability is lowered. Deposits formed on the combustion chamber walls, on the other hand, tend to increase octane requirements. Therefore, there have been strong requirements to control formation of deposits, both in air-intake system and combustion chamber.

A number of techniques have been proposed to reduce gums in gasoline. For example, Japanese Laid-open Patent Application No. 10-77486 discloses gasoline incorporated with an aliphatic nitroxide compound to control formation of gums. Japanese Laid-open Patent Application No. 9-95688 discloses gasoline aimed at improvement of cleanliness in an air-intake valve and port in a gasoline engine, claiming that formation of deposits on combustion chamber walls can be controlled when gasoline has an octane number of 98 or more, 50% distillation point of 75° C. to 95° C., 97% distillation point of 155° C. or less, aromatic hydrocarbon content of 35 vol % or less, and content of 10 vol % or less for aromatic hydrocarbons having a carbon number of 8 or more. Japanese Laid-open Patent Application No. 9-286992 discloses that an unleaded gasoline composition shows excellent effects of cleaning an air-intake system and combustion chamber, when it is incorporated with a polyetheramine-based detergent at 70 ppm or more and satisfies a specific relationship involving aromatic hydrocarbon content and distillation temperature.

However, none of these techniques shows sufficient effects of controlling formation of gums, or improving cleanliness in air-intake system or combustion chamber. In particular, the technique which depends on use of an additive tends to increase gasoline production cost.

It is an object of the present invention to provide an unleaded, high-octane gasoline composition which forms little gums, and shows excellent effects of cleaning an air-intake system and combustion chamber of a gasoline engine.

DESCRIPTION OF THE INVENTION

It has been found that heavy aromatic hydrocarbons present in gasoline have an effect on gum formation, and cleanliness of an air-intake system and combustion chamber of a gasoline engine, that there is a correlation between content of aromatic hydrocarbons having a carbon number of 11 or more and formation of gums or cleanliness of air-intake system and combustion chamber, and that the extent of the effects of the aromatic hydrocarbons having a carbon number of 11 or more vary depending on reformer type by which they are produced.

The present invention is an unleaded, high-octane gasoline composition containing (A) at least one reformate fraction produced by a continues regeneration type reformer and/or (B) at least one reformate fraction produced by a fixed-bed type reformer, and satisfies the following conditions (1) to (3):

(1)

$$Z=(1/100)[\Sigma(ax)+(1/9)\Sigma(by)]<0.010$$

wherein, Σ(ax) is a summation of (ax), wherein (a) is content (vol %) by volume of a fraction falling into the reformate fraction A, (x) is content (vol %) by volume of aromatic hydrocarbons having a carbon number of 11 or more in the fraction (a), and Σ(by) is a summation of (by), wherein (b) is content (vol %) by volume of a fraction falling into the reformate fraction B, (y) is content (vol %) by volume of aromatic hydrocarbons having a carbon number of 11 or more in the fraction (b).

(2) content of aromatic hydrocarbons having a carbon number of 7 to 8 being 30 vol % or more, and (3) research octane number being 96.0 or more.

At least one reformate fraction (A) means reformate produced by a continuous regeneration type reformer or such reformate treated by fractionation, and at least one reformate fraction (B) means reformate produced by a fixed-bed type reformer or such reformate treated by fractionation.

The present invention relates, as described above, to an unleaded, high-octane gasoline composition, which includes the following as one of the preferred embodiments:

(1) An unleaded, high-octane gasoline composition with Z in the above formula being less than 0.005.

DETAILED DESCRIPTION OF THE INVENTION (A) Reformate Fraction

The reformate fraction useful for the present invention may be produced by the reforming reactions, involving, e.g., isomerization, dehydrogenation, cyclization and hydrocracking, of heavy naphtha boiling at around 40° C. to 230° C. under elevated temperature and pressure over a reforming catalyst in a flow of hydrogen. The reforming catalysts useful for the present invention include a platinum-based one or bimetallic one with platinum combined with another metal, e.g., rhenium, iridium or germanium. The normal reaction conditions are 450° C. to 540° C. and 7 to 50 kg/cm$^2$ as reaction temperature and pressure.

The present invention contains one or more specific types of reformate produced from a heavy naphtha fraction by a reformer, namely (A) at least one reformate fraction produced by a continuous regeneration type reformer and/or (B) at least one reformate fraction produced by a fixed-bed type reformer. The reformate fraction (A) may be as-received one produced by a continuous regeneration type reformer or such reformate treated by fractionation, and the reformate fraction (B) may be as-received one produced by a fixed-bed type reformer or such reformate treated by fractionation.

A continuous regeneration type reformer uses a moving bed type reactor, the catalyst being continuously withdrawn therefrom and recycled back thereto after being regenerated by a regenerator. It is characterized by continuous operation (i.e., it is not necessary to stop the operation for catalyst regeneration), and catalyst continuously keeping high activity to give reformate in high yield during the service period. A fixed-bed type reformer is stopped at intervals of 6 to 12 months for catalyst regeneration.

(B) Unleaded, High-Octane Gasoline Composition

The unleaded, high-octane gasoline composition of the present invention contains, as described above, (A) at least one reformate fraction produced by a continuous regeneration type reformer and/or (B) at least one reformate fraction produced by a fixed-bed type reformer, and satisfies, as the essential condition, the following relationship involving contents of these fractions in the composition and content of aromatic hydrocarbons having a carbon number of 11 or more:

$$Z=(1/100)[\Sigma(ax)+(1/6)\Sigma(by)]<0.010$$

wherein, Σ(ax) is a summation of (ax), wherein (a) is content (vol %) by volume of a fraction falling into the reformate fraction A, (x) is content (vol %) by volume of aromatic hydrocarbons having a carbon number of 11 or more in the fraction (a), and Σ(by) is a summation of (by), wherein (b) is content (vol %) by volume of a fraction falling into the reformate fraction B, (y) is content (vol %) by volume of aromatic hydrocarbons having a carbon number of 11 or more in the fraction (b).

Aromatic hydrocarbons having a carbon number of 11 or more, known for their poor combustibility, tend to cause deposits to be formed on air-intake pipes and valves during the combustion process, as its content in gasoline increases, more noted during the acceleration period where the engine rotates at a higher speed. These deposits, when sufficiently accumulated, will return back into a combustion chamber as a liquid flow and be carbonized therein, to be fast deposited on the combustion walls or exhausted in air before being completely burnt. It is also known that gums are formed more in gasoline, as content of aromatic hydrocarbons having a carbon number of 11 or more increases.

Formation of gums and deposition of sludge or deposits on an air-intake system and/or in combustion chamber are accelerated as the Z value increases beyond 0.010. Therefore, the Z value should be below 0.01, preferably below 0.005.

The unleaded, high-octane gasoline composition of the present invention also contains aromatic hydrocarbons having a carbon number of 7 to 8 (i.e., toluene and xylene) at a total content of 30 vol % or more. At below 30 vol %, octane number of gasoline decreases, making it difficult to keep research octane number at 96.0 or more. It is known, however, that an excessively high content of aromatic hydrocarbons having a carbon number of 7 to 8 may have adverse effects on fuel system members. It is also known that an aromatic hydrocarbon having a carbon number of 8 excites ozone-formation activity of the exhaust gases, thus accelerating formation of photochemical oxidants. Therefore, content of an aromatic hydrocarbon having a carbon number of 8 should be kept at an as low a level as possible.

The unleaded, high-octane gasoline composition of the present invention also has a research octane number of 96.0 or more.

The other gasoline blending stocks useful for the present invention are not limited. They include straight-run naphtha, FCC naphtha, alkylate, toluene, toluene fraction and butane fraction. They are straight-run naphtha produced by atmospheric distillation of various types of crudes (e.g., paraffin base, naphthene base, mixed base, special crude, and a mixture thereof), or petroleum fractions coming from various types of processes, e.g., catalytic cracking and hydrocracking. The other blending stocks useful for the present invention include those derived from oil shale, oil sand and coal, and those produced by synthesis from methanol.

The unleaded, high-octane gasoline composition of the present invention may be incorporated, as required, with one or more types of known gasoline additives so long as they do not damage the purpose of the present invention. These additives include surface ignition inhibitors, e.g., tricresylphosphate (TCP) and trimethyl phosphate; metal deactivators represented by salicylidene derivatives, e.g., N,N'-salicylidene diaminopropane; anti-icing agents, e.g., alcohols and imide succinate; corrosion inhibitors, e.g., aliphatic amine salts, sulfonates and phosphates of alkyl amines; anti-static agents, e.g., anionic, cationic and ampholytic surfactants; coloring agents, e.g., azo dyes; and antioxidants represented by phenols (e.g., 2,6-di-tert.-butyl-p-cresol) and aromatic amines (e.g., phenyl-α-naphthylamine). These additives may be used either individually or in combination. They are used normally at 0.5 wt % or less, based on the total weight of the gasoline composition, although not limited.

The unleaded, high-octane gasoline composition of the present invention may be also incorporated with one or more types of oxygenated compounds, so long as they do not damage the purpose of the present invention. These oxygenated compounds useful for the present invention include methanol, ethanol, methyl-tert.-butyl ether, and ethyl-tert.-butyl ether. They are used normally at 0.1 to 10%, based on the total weight of the gasoline composition, although not limited.

(C) Production of the Unleaded, High-Octane Gasoline Composition

The unleaded, high-octane gasoline composition of the present invention is produced by blending at least one reformate fraction (A) and/or at least one reformate fraction (B) with one or more other gasoline blending stocks, such as those described above. Their contents are not limited, so long as the final composition has the above-described Z value of below 0.010, 30 vol % or more of aromatic hydrocarbons having a carbon number of 7 to 8 and a research octane number of 96.0 or more, and satisfies the specifications set by JIS K-2202 for No. 1 automobile gasoline.

Straight-run naphtha, obtained by atmospheric distillation of a crude, is used to adjust properties of gasoline, e.g., those related to distillation, because of very low research octane number of the fraction boiling at intermediate to high temperature.

FCC naphtha is obtained by catalytic cracking of a wide range of petroleum fraction from kerosene/gas oil to atmospheric residua, preferably heavy gas oil and vacuum gas oil, over a solid, acidic catalyst. It has a research octane number of around 90 to 100.

Alkylate is obtained by polymerization of isobutane and lower olefin compounds, e.g., butene and propylene, over an acidic catalyst, e.g., sulfuric acid, hydrofluoric acid and aluminum chloride. It has a research octane number of around 90 to 100.

Toluene or a toluene fraction is obtained by, e.g., extraction with sulfolane or another adequate solvent of catalytic reformate and cracked gasoline as one of the products of ethylene production. It has a research octane number of around 115 to 120.

A butane fraction is composed mainly of butane, obtained by rectification of light, straight-run naphtha, and obtained on catalytic cracking and catalytic reforming. It has a peculiarly high research octane number for a straight-run naphtha component, at around 88 to 95.

EXAMPLE

The present invention is described more concretely by the following non-limiting Example. Example and Comparative Example used the following gasoline blending stocks and additives. The analytical procedure for aromatic hydrocarbons is also described.

(1) Gasoline Blending Stocks

Properties of gasoline blending stocks are given in Table 1.

TABLE 1

| | Reformate | Reformate Fractions | | | | FCC |
|---|---|---|---|---|---|---|
| | Fraction A1 | B1 | B2 | B3 | Alkylate | Naphtha |
| Specific gravity (15/15° C.) | 0.8756 | 0.7480 | 0.8669 | 0.8560 | 0.6998 | 0.6751 |
| Distillation (°C.) | | | | | | |
| Initial boiling point | 139 | 25 | 106 | 104 | 33 | 32 |
| 10% | 143 | 34 | 108 | 107 | 74 | 43 |
| 50% | 147 | 87 | 109 | 108 | 104 | 53 |
| 90% | 165 | 166 | 110 | 109 | 118 | 84 |
| End point | 199 | 180 | 111 | 113 | 188 | 130 |
| Research octane number | 117 | 95.5 | 120 | 108 | 96 | 94 |
| Unwashed existent gums (mg/100 ml) | 35.0 | 0.6 | 0 | 0.8 | 0 | 0 |
| Aromatic hydrocarbons (vol %) (carbon number of 11 or more) | 0.35 | 0.09 | 0.00 | 0.00 | — | — |

(2) Gasoline Additives

Automate Red-BR (Morton Chemical) and Automate Oragne #2R (Morton Chemical) were used as coloring agents, and DMD (Octel) was used as a metal deactivator.

(3) Analysis of Aromatic Hydrocarbons

Gas chromatography was used to determine contents of aromatic hydrocarbons having a carbon number of 11 or more, present in reformate fractions A and B. The test apparatus and conditions are described in Table 2. Contents of aromatic hydrocarbons having a carbon number of 7 to 8 were also determined in a similar manner, for Example and Comparative Example.

TABLE 2

| | |
|---|---|
| Test Apparatus | |
| Gas Chromatograph | Shimadzu, GC-14B |
| Detector | Flame ionization detector |
| Column | Capillary column (inner diameter: 0.2 mm; length: 50 m) Immobilized phase liquid (cross-linked methyl silicon) Carrier gas (nitrogen, flown at around 1 mL/minute) |
| Sample Inlet | Split type (split ratio: 1/50) |
| Test Conditions | |
| Sample Quantity | 0.2 μL |
| Column Temperature | 5 to 200° C. (2° C./minute, 5° C./minute) |

EXAMPLE

The gasoline blending stocks, given in Table 1, were blended to prepare the gasoline composition (Table 3), which was incorporated with the coloring agents and metal deactivator at 10 wt. Ppm (total content) and 5 wt. ppm, respectively, based on the weight of the whole composition.

This composition was tested for engine cleanliness. The gasoline properties and cleanliness test results are given in Table 3.

TABLE 3

| | EXAMPLE | COMPARATIVE EXAMPLES 1 | COMPARATIVE EXAMPLES 2 |
|---|---|---|---|
| Gasoline Composition (vol %) | | | |
| Reformate fraction (A)① | | | |
| (A1) | — | 17 [0.35] | 25 [0.35] |
| Reformate fractions (B)② | | | |
| (B1) | 30 [0.09] | — | — |
| (B2) | 25 [0.00] | — | — |
| (B3) | — | 17 [0.00] | 15 [0.00] |
| Alkylate | 15 | 12 | 11 |
| FCC naphtha | 27 | 50 | 45 |
| Butane | 3 | 4 | 4 |
| (Total) | (100) | (100) | (100) |
| Gasoline Properties | | | |
| Z value | 0.003 | 0.06 | 0.09 |
| Aromatic hydrocarbon ($C_7$/$C_8$) content (vol %) | 33 | 34 | 36 |
| Research octane number | 99.7 | 99.7 | ≧100 |
| Unwashed existent gums (mg/100 ml) | 1.1 | 3.7 | 6.0 |
| Engine cleanliness③ | | | |
| IVD (mg/valve) | 139 | 198 | 170 |
| CCD (g/cylinder) | 0.78 | 1.14 | 1.48 |

①Reformate fraction produced by a continuous regeneration type reformer. Number in [ ] indicates content of aromatic hydrocarbons having a carbon number of 11 or more (vol %).
②Reformate fraction produced by a fixed-bed type reformer. Number in [ ] indicates content of aromatic hydrocarbons having a carbon number of 11 or more (vol %).
③IVD: Quantity of deposits on the air-intake valve
CCD: Quantity of deposits on the combustion chamber wall.

The engine cleanliness test was conducted by the following procedure:

The test engine (Table 4) was operated by an operational pattern (Table 5), in which a total of 5 running modes were combined, for 100 hours (one cycle taking 15 minutes was repeated 400 times). The engine tested was disassembled to measure quantities of deposits picked up from the air-intake valve (IVD) and combustion chamber wall (CCD).

TABLE 4

| | |
|---|---|
| Engine type | Toyota IG-FE |
| Number of cylinders | 6 cylinders in series |
| Combustion chamber type | Pentroof type |
| Valve mechanism | 4-valve, DOHC |
| Inner diameter and stroke (mm) | 75 and 75 |
| Displacement (mL) | 1988 |
| Compression ratio | 9.6 |
| Maximum output (ps/rpm) | 135/5600 (net) |
| Maximum torque (m. Kg-f/rpm) | 18.0/4800 |

TABLE 4-continued

| | |
|---|---|
| Fuel supply mode | PFI |
| Knock sensor | (provided) |

TABLE 5

| Running Modes | Speed (Km/h) | Running Time (minutes) | (Percentages) |
|---|---|---|---|
| (1) Idling | 0 | 1.50 | (10) |
| (2) Running in an urban area | 40 | 4.95 | (33) |
| (3) Running in a suburban area | 60 | 2.55 | (17) |
| (4) Running at a high speed | 100 | 3.00 | (20) |
| (5) Acceleration and deceleration | 60–100–0 | 3.00 | (20) |
| | (Total) | 15.00 | (100) |

Comparative Examples

The gasoline compositions were prepared in Comparative Examples 1 and 2 in a manner similar to that used for Example. They were tested for engine cleanliness, also similarly. Gasoline properties and cleanliness test results are given in Table 3.

What is claimed is:

1. An unleaded, high-octane gasoline composition comprising (A) at least one reformate fraction produced by a continuous regeneration type reformer and/or (B) at least one reformate fraction produced by a fixed-bed type reformer, said unleaded, high octane gasoline composing satisfying the following conditions (1) to (3):

(1)

$$Z=(1/100)[\Sigma(ax)+(1/6)\Sigma(by)]<0.010$$

wherein, Σ(ax) is a summation of (ax), wherein (a) is content (vol %) by volume of a fraction falling into the reformate fraction A, (x) is content (vol %) by volume of aromatic hydrocarbons having a carbon number of 11 or more in the fraction (a), and Σ(by) is a summation of (by), wherein (b) is content (vol %) by volume of a fraction falling into the reformate fraction B, (y) is content (vol %) by volume of aromatic hydrocarbons having a carbon number of 11 or more in the fraction (b), (2) content of aromatic hydrocarbons having a carbon number of 7 to 8 being 30 vol % or more, and (3) research octane number being 96.0 or more.

2. The unleaded, high octane gasoline of claim 1 wherein Z is less than 0.005.

3. The unleaded, high octane gasoline of claim 1 or 2 additized with at least one gasoline additive.

* * * * *